United States Patent [19]
Billy et al.

[11] Patent Number: 5,509,271
[45] Date of Patent: Apr. 23, 1996

[54] PROCESS AND INSTALLATION FOR THE SEPARATION OF A GASEOUS MIXTURE

[75] Inventors: Jean Billy, Le Plessis Trevise; François Granier, Nogent Sur Marne; Pascal Victor, Grenoble, all of France

[73] Assignee: L'Air Liquide, Societe Anonyme pour l'Etude et l'Exploitation des Procedes Georges Claude, Paris Cedex, France

[21] Appl. No.: 382,499

[22] Filed: Feb. 2, 1995

[30] Foreign Application Priority Data

Apr. 13, 1994 [FR] France .................................. 94 04392

[51] Int. Cl.⁶ ...................................................... F25J 3/02
[52] U.S. Cl. ............................................................ 62/620;
[58] Field of Search .................................... 62/24, 25, 28

[56] References Cited

U.S. PATENT DOCUMENTS

| | | | |
|---|---|---|---|
| 4,596,588 | 6/1986 | Cook | 62/28 |
| 4,805,414 | 2/1989 | Fisher | 62/28 |
| 4,966,612 | 10/1990 | Bauer | 62/24 |
| 5,133,793 | 7/1992 | Billy | 62/23 |

FOREIGN PATENT DOCUMENTS 4210638  3/1993  Germany .

OTHER PUBLICATIONS

Dr. Ralph Berninger, "Fortschritte bei der H2/CO-Tieftemperaturzerlegung", Berichte aus Technik und Wissenschaft, 1988, vol. 62, pp. 18–23.

Don W. Green, "Properties of cryogenic fluids", Perry's Chemical Engineers' Handbook, 1984, pp. 12–47 and 12–48.

*Primary Examiner*—Ronald C. Capossela
*Attorney, Agent, or Firm*—Young & Thompson

[57] ABSTRACT

Carbon monoxide and hydrogen are from a gaseous mixture comprising essentially these two components and methane, by the steps of i) cooling the initial gaseous mixture so as partially to condense it; ii) separating a condensed portion of the mixture from an uncondensed portion containing principally hydrogen; iii) sending the condensed portion to a stripping column (7) to produce a gaseous fraction at the head of the column comprising hydrogen and a liquid fraction at the base of the column containing carbon monoxide and methane; iv) distilling the liquid fraction in a purification column (9) to produce substantially pure carbon monoxide at the head of the column and methane at the base of the column; and v) supplying a portion of the separation energy by a refrigeration cycle using an autonomous refrigeration fluid.

17 Claims, 1 Drawing Sheet

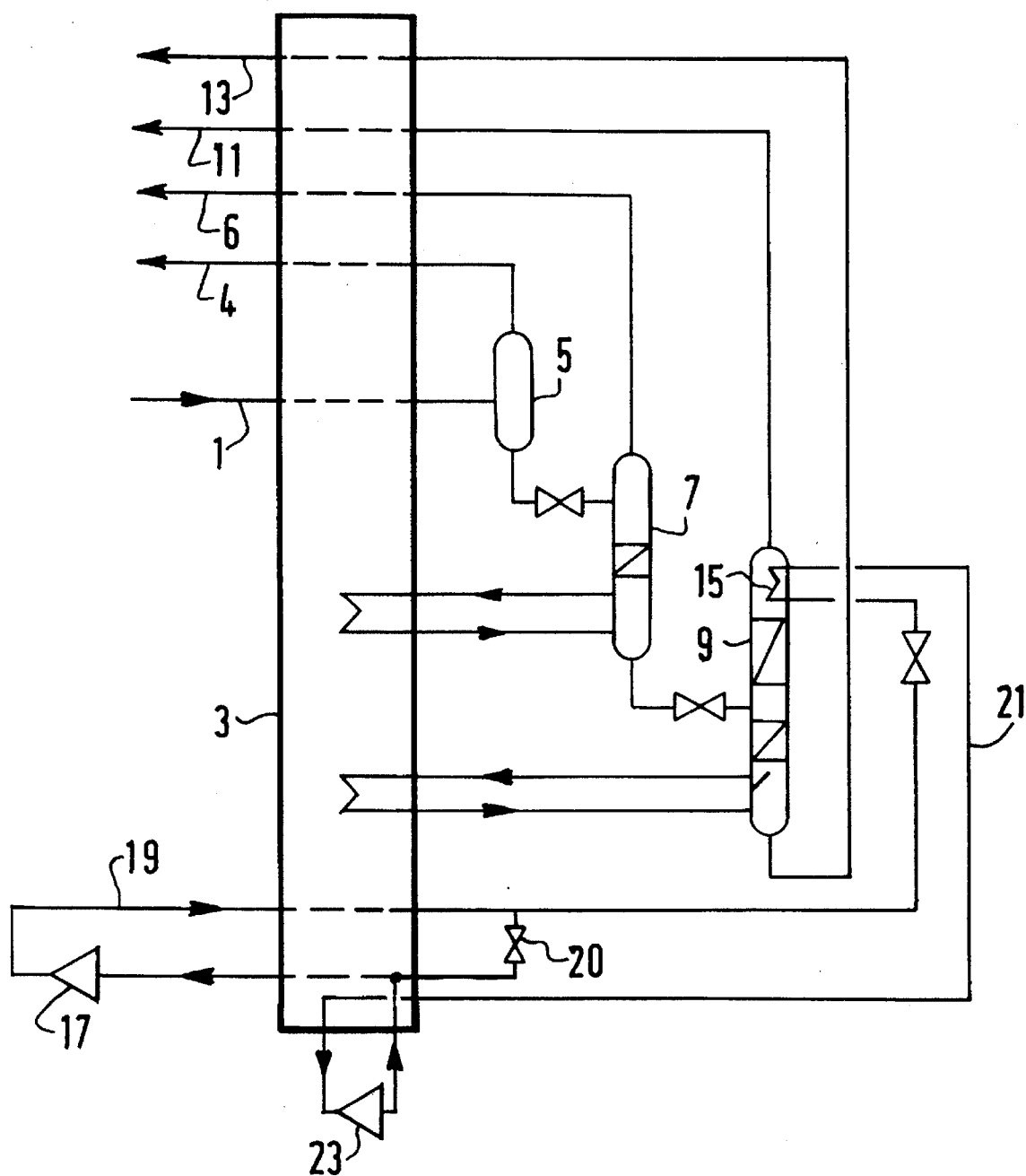

PROCESS AND INSTALLATION FOR THE SEPARATION OF A GASEOUS MIXTURE

The present invention relates to a process and an installation for the separation of a gaseous mixture containing hydrogen, carbon monoxide and methane to produce hydrogen and carbon monoxide as pure products.

In the conventional process, so-called "partial condensation", the hydrogen, separated from the gaseous mixture, after cooling to low temperature, is expanded to a pressure of the order of 5 to 10 bars so as to supply the cold to maintain the installation cold, and to cool the gaseous mixture to below −200° C. An installation of this type is described in U.S. Pat. No. 4,217,759 and uses at least four columns to produce carbon monoxide with a recovery of 95% and a purity of about 99%. The recovery of hydrogen is of the order of 99.9% with a purity of about 95%.

The invention has for its object, while maintaining these purities and these high recoveries, to simplify the process and the installation, by reducing the number of columns used for the separation stages. It also has for its object to ensure that the lowest temperature of the installation will be above that of the conventional process and to provide an installation with reduced capital costs relative to the prior art.

To this end, the invention has for its object a process for the production of carbon monoxide and hydrogen from a gaseous mixture comprising essentially these two components and methane, characterized in that it comprises the following steps:

i) cooling the initial gaseous mixture so as partially to condense it;

ii) separating a condensed portion of the mixture from an uncondensed portion containing principally hydrogen;

iii) sending said condensed portion into a stripping column to produce a gaseous fraction at the head of the column comprising hydrogen and a liquid fraction at the base of the column containing carbon monoxide and methane;

iv) distilling the liquid fraction in a purification column to produce substantially pure carbon monoxide at the head of the column and methane at the base of the column; and v) supplying a portion of the separation energy by means of a refrigeration cycle using an autonomous refrigeration fluid.

Preferably, the refrigeration fluid serves to cool a head condenser of the purification column.

The refrigeration fluid can also heat the base of the stripping column, the base of the purification column, or both.

Although the refrigeration fluid is preferably nitrogen, it could also be selected from the group comprising air, oxygen, argon and carbon dioxide.

The invention also has for its object an installation for the production of carbon monoxide and hydrogen from a gaseous mixture comprising essentially these two components and methane, characterized in that it comprises:

a phase separator, a stripping column, a purification column, means to introduce the gaseous mixture into the phase separator and to withdraw a gaseous portion, comprising essentially hydrogen, and a liquid portion, means to send the liquid portion to the stripping column, to withdraw therefrom a liquid containing principally methane and carbon monoxide and to send this liquid to the purification column, means to withdraw from the purification column gaseous carbon monoxide, and means to supply a portion of the separation energy by means of a refrigeration cycle using an autonomous refrigeration fluid.

The refrigeration cycle can provide the reflux at the head of the purification column constituted by a refrigeration fluid cycle.

The refrigeration fluid cycle comprises a compressor to compress the refrigeration fluid to a pressure between 10 and 34 bars, according to the system of reboiling used at the base of the purification column.

When said bottom is heated by a conventional reboiler, the pressure of the refrigeration fluid rises to above 25 bars.

The cycle is particularly simple and can use a compressor of standard type which is less costly, with, if desired, a turbine to supply cold to the system.

With this process as claimed, there is no need to cool the gas to be treated to −200° C. as before, a temperature of −194° C. suffices for the separation process.

Other characteristics and advantages of the invention will become apparent from the description which follows, given with reference to the accompanying drawing, which is a diagram of a separation operation according to the embodiment of the invention.

In the system shown in the drawing, a synthesis gas mixture contains residual methane as well as hydrogen and carbon monoxide. This mixture conventionally contains 50 to 70 mol % hydrogen, 15 to 45 mol % carbon monoxide and 2 to 6 mol% methane, with small quantities of impurities.

The gaseous mixture to be treated is compressed to 45 bars, passes through conduit 1 and is subjected to cooling to a temperature of about −194° C. in the exchanger 3, which it leaves partially condensed. A liquid fraction and a gaseous fraction are withdrawn from the phase separator 5. The gaseous fraction contains essentially hydrogen and is then reheated in exchanger 3 to constitute the major portion of the hydrogen product 4 at elevated pressure.

The liquid fraction, containing principally hydrogen and carbon monoxide, is expanded in a valve to reduce its pressure in the stripping column 7, to 12.5 bars.

The flash gas containing hydrogen from this column 7 can be mixed with the principal hydrogen flow 4, so as to maximize the quantity of hydrogen recovered. Otherwise, it can constitute a medium pressure hydrogen product. The liquid from this column 7, at −160.3° C., is comprised principally of carbon monoxide which is then expanded to −177.5° C. and purified by distillation in a purification column 9 at 4 bars to produce as head gas pure carbon monoxide and, as base liquid, methane. The carbon monoxide and the methane containing heavy impurities are withdrawn respectively through conduits 11, 13 and reheated in exchanger 3.

The head condenser 15 of the purification column 9 is cooled by an autonomous refrigeration fluid cycle whose cycle fluid is nitrogen, which cycle is entirely separate from the circuits of the other recited fluids.

The cycle nitrogen, from an external source, subjected to compression in a compressor 17 to 10 bars, passes through a high pressure conduit 19, is cooled and liquefied in the exchanger 3, before being expanded and separated into two streams. A first stream is introduced into the head condenser 15 wherein it vaporizes at 4.5 bars. A second nitrogen stream at 10 bars is subjected to Joule-Thomson expansion in a valve 20 to 1.2 bar and then sent to exchanger 3 in which it is reheated before being compressed by the compressor 17.

The nitrogen vaporized in the condenser is only partially reheated in exchanger 3 before being expanded in turbine 23 from 4.5 to 1.2 bar, remixed with the nitrogen expanded through the valve 20, before being reheated and sent to compressor 17.

Turbine 23 can be replaced by another cold production means such as the injection of liquid nitrogen into the conduit 21 upstream of exchanger 3. After being vaporized in the exchanger, the excess gaseous nitrogen is purged upstream or downstream of the compressor 17.

In the case in which the cold part of the installation is sufficiently well insulated, all cold production means can be omitted because the thermal losses are compensated by the Joule-Thomson effect of the gas to be treated and of the cycle fluid.

The base of the purification column 9 is heated by withdrawing nearly pure liquid carbon monoxide from the first plate from the bottom of the column, this liquid being partially vaporized in exchanger 3, before being returned to the base of the column below its point of withdrawal, the temperature gradient between the first plate and the base of the purification column 9 being particularly great.

The base of the stripping column 7 is heated in the same way by partially vaporizing in exchanger 3 the liquid from the first plate.

We claim:

1. In a process for the production of carbon monoxide and hydrogen from a gaseous mixture consisting essentially of these two components and methane; the improvement comprising the following steps:

i) cooling a said gaseous mixture so as partially to condense it;

ii) separating a condensed portion of the mixture from an uncondensed portion containing principally hydrogen;

iii) sending said condensed portion to a stripping column to produce a gaseous fraction at the head of the column comprising hydrogen and a liquid fraction at the base of the column containing carbon monoxide and methane;

iv) distilling the liquid fraction in a purification column to produce substantially pure carbon monoxide at the head of the column and methane at the base of the column; and v) supplying a portion of the separation energy by means of a refrigeration cycle using an autonomous refrigeration fluid.

2. Process according to claim 1, in which the head of the purification column is cooled by vaporizing the refrigeration fluid.

3. Process according to claim 1, in which at least one of the base of the purification column and the base of the stripping column are heated by means of the refrigeration fluid.

4. Process according to claim 1, in which the refrigeration fluid is selected from the group consisting of nitrogen, air, oxygen, argon and carbon dioxide.

5. Process according to claim 1, in which the refrigeration fluid is liquefied and compressed to a pressure of 10 to 34 bars before being vaporized in the head condenser of the purification column.

6. Process according to claim 5, in which the refrigeration fluid used to cool the condenser is expanded in a turbine so as to supply the cold necessary to cool the apparatus and is reheated and returned to the intake of the compressor.

7. Process according to claim 5, in which a portion of the refrigeration fluid in liquid phase is subjected to Joule-Thomson expansion and returned to the intake of the compressor after being reheated.

8. Process according to claim 1, in which cold is produced by returning a stream of refrigeration fluid in liquid phase to the cycle which is then vaporized in an exchanger.

9. Process according to claim 8, in which the base of the purification column is heated with a liquid withdrawn from below a first plate of the purification column, vaporized at least partially in the exchanger and reintroduced into the purification column at a point below the point of withdrawal.

10. Process according to claim 8, in which the base of the stripping column is heated with a liquid withdrawn below a first plate of the stripping column, at least partially vaporized in the exchanger and reintroduced into the purification column at a point below the point of withdrawal.

11. Installation for the production of carbon monoxide and hydrogen from a gaseous mixture comprising essentially these two components and methane, comprising:

a phase separator, a stripping column, a purification column, means to introduce a said gaseous mixture into the phase separator and to withdraw therefrom a gaseous portion consisting essentially of hydrogen and a liquid portion, means to send the liquid portion to the stripping column and to withdraw from the stripping column a liquid containing principally methane and carbon monoxide and to send this liquid to the purification column, means to withdraw from the purification column gaseous carbon monoxide, and means to supply a portion of the separation energy by means of a refrigeration cycle using an autonomous refrigeration fluid.

12. Installation according to claim 11, in which the refrigeration fluid cycle cools the head of the purification column.

13. Installation according to claim 11, further comprising means to heat the base of the purification column and the base of the stripping column constituted by the refrigeration fluid cycle.

14. Installation according to claim 11, in which the refrigeration fluid is selected from the group consisting of nitrogen, air, oxygen, argon and carbon dioxide.

15. Installation according to claim 11, in which the refrigeration fluid cycle comprises a compressor adapted to compress the refrigeration fluid to a pressure of 10 to 34 bars.

16. Installation according to claim 15, in which, to maintain the system cold, the refrigeration fluid used to cool the head of the purification column is expanded in a turbine, reheated and resent to the compressor.

17. Installation according to claim 16, further comprising means to expand by the Joule-Thomson effect a portion of the compressed fluid before returning it to the compressor.

* * * * *